United States Patent [19]
Steed

[11] Patent Number: 5,934,422
[45] Date of Patent: Aug. 10, 1999

[54] STEP MOTOR ACTUATED CONTINUOUSLY VARIABLE SHOCK ABSORBER

[75] Inventor: David L. Steed, Perrysburg, Ohio

[73] Assignee: Tenneco Automotive Inc., Lake Forest, Ill.

[21] Appl. No.: 08/819,544

[22] Filed: Mar. 17, 1997

[51] Int. Cl.⁶ ....................................................... F16F 5/00
[52] U.S. Cl. .................. 188/318; 188/299.1; 188/322.13
[58] Field of Search .................................... 188/281, 318, 188/322.13, 299.1; 280/707, 714

[56] References Cited

U.S. PATENT DOCUMENTS

| | | |
|---|---|---|
| 3,757,910 | 9/1973 | Palmer . |
| 4,113,072 | 9/1978 | Palmer . |
| 4,826,207 | 5/1989 | Yoshioka et al. . |
| 4,854,429 | 8/1989 | Casey . |
| 4,890,858 | 1/1990 | Blankenship . |
| 5,285,878 | 2/1994 | Scheffel et al. . |
| 5,586,627 | 12/1996 | Nezu et al. ..................... 188/322.13 X |
| 5,588,510 | 12/1996 | Wilke .............................. 188/322.13 X |
| 5,655,633 | 8/1997 | Nakadate et al. .............. 188/322.13 X |

*Primary Examiner*—Robert J. Oberleitner
*Assistant Examiner*—Pamela J. Lipka
*Attorney, Agent, or Firm*—Harness, Dickey & Pierce, PLC

[57] ABSTRACT

A shock absorber includes the typical fluid valving in the piston and in the base valve assembly which is designed to provide a firm damping characteristic for the shock absorber. A stepper valve assembly includes a bypass fluid passage between the upper working chamber and the reserve chamber which when opened provides a soft damping characteristic during an extension movement of the shock absorber. The stepper valve assembly also includes a bypass fluid passage between the lower working chamber and the reserve chamber which when opened provides a soft damping characteristic during a compression movement of the shock absorber. The stepper valve assembly selectively opens and closes the bypass fluid passages to adapt the shock absorber to changing vehicle conditions.

20 Claims, 9 Drawing Sheets

STEP MOTOR ACTUATED CONTINUOUSLY VARIABLE SHOCK ABSORBER

FIELD OF THE INVENTION

The present invention relates to a hydraulic damper or shock absorber adapted for use in a suspension system such as the suspension systems used for automotive vehicles. More particularly, the present invention relates to a hydraulic damper or shock absorber having a continuously variable damping characteristic which is adjustable by a stepper motor between a relatively low level of damping for a soft ride and a relatively high level of damping for a firm ride.

BACKGROUND OF THE INVENTION

A conventional prior art hydraulic damper or shock absorber comprises a cylinder which is adapted at one end for attachment to the sprung or unsprung mass of a vehicle. A piston is slidably disposed in the cylinder with the piston separating the interior of the cylinder into two liquid chambers. A piston rod is connected to the piston and extends out of one end of the cylinder where it is adapted for attachment to the other of the sprung or unsprung mass of the vehicle. A first valving system is incorporated within the piston for generating a damping force during the shock absorber's extension stroke of the piston with respect to the cylinder and a second valving system is incorporated within the piston for generating a damping force during the shock absorber's compression stroke of the piston with respect to the cylinder.

Various types of adjustment mechanisms have been developed to generate variable damping forces in relation to the speed and/or the amplitude of the displacement of the piston within the cylinder. These adjustment mechanisms have mainly been developed to provide a relatively small or low damping characteristic during the normal steady state running of the vehicle and a relatively large or high damping characteristic during vehicle maneuvers requiring extended suspension movements. The normal steady state running of the vehicle is accompanied by small or fine vibrations of the unsprung mass of the vehicle and thus the need for a soft ride or low damping characteristic of the suspension system to isolate the sprung mass from these vibrations. During a turning or braking maneuver, as an example, the sprung mass of the vehicle will attempt to undergo a relatively slow and/or large vibration which then requires a firm ride or high damping characteristic of the suspension system to support the sprung mass and provide stable handling characteristics to the vehicle. These adjustable mechanisms for the damping rates of a shock absorber offer the advantage of a smooth steady state ride by isolating the high frequency/small excitations from the sprung mass while still providing the necessary damping or firm ride for the suspension system during vehicle maneuvers causing larger excitations of the sprung mass.

The continued development of shock absorbers includes the development of adjustment systems which provide the vehicle designer with a continuously variable system which can be specifically tailored to a vehicle to provide a specified amount of damping in relation to various monitored conditions of the vehicle and its suspension system.

SUMMARY OF THE INVENTION

The present invention provides the art with a continuously variable, bi-directional adjustable hydraulic damper or shock absorber that includes the capability of adjusting the damping rate of the shock absorber between a soft ride or low damping configuration and a firm ride or high damping configuration. A stepper motor adjusts the shock absorber between these two configurations and has the capability of positioning the shock absorber in the soft ride configuration. The firm ride position or any position between these two configurations to provide the continuously variable damping for the shock absorber.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 8 is a cross-sectional view of the valving system of the piston of the shock absorber with the arrows illustrating the fluid flow during extension of the shock absorber;

DETAILED DESCRIPTION OF THE PREFERRED EMBODIMENT

Figure 1:
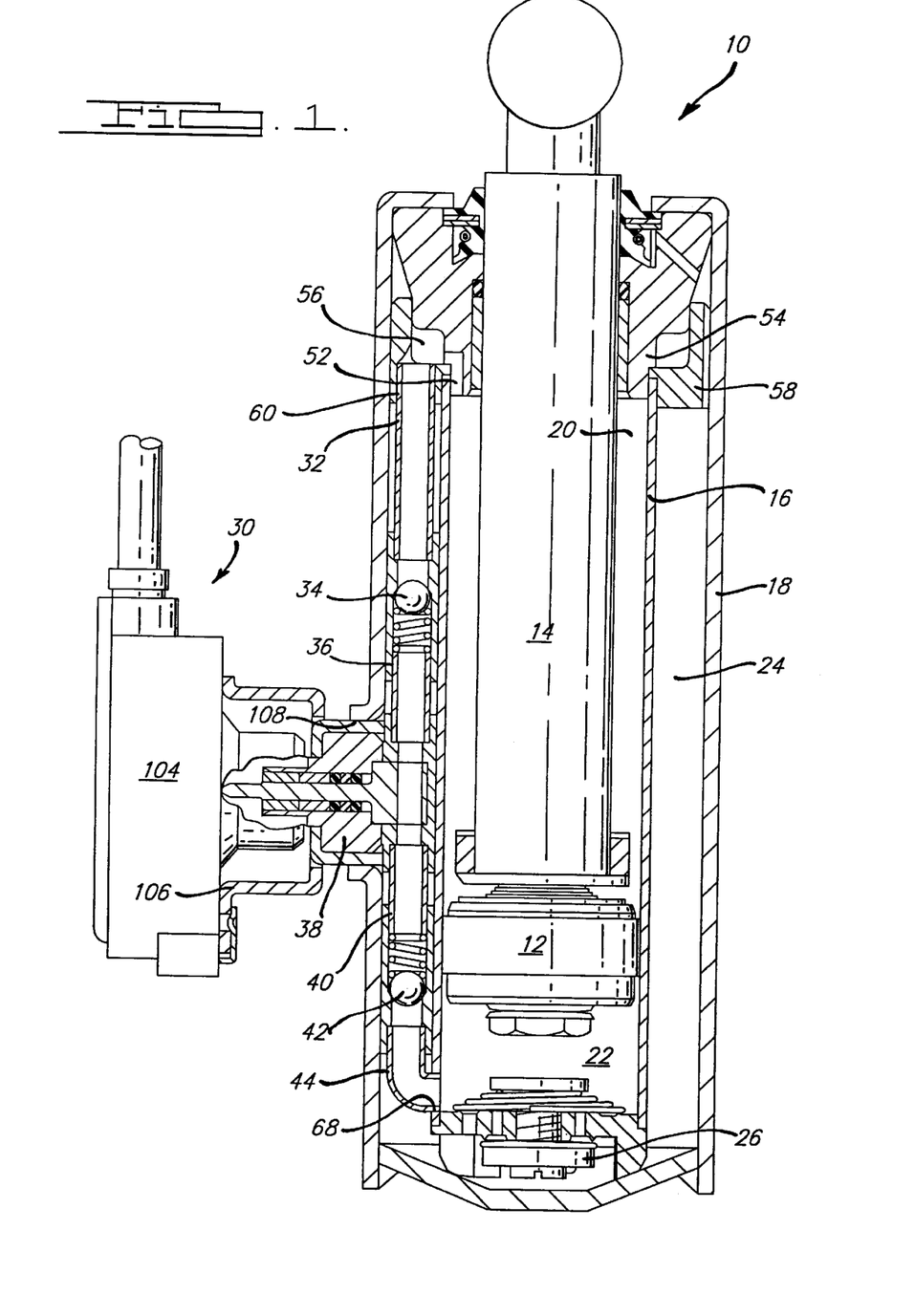
FIG. 1 is a cross-sectional side view of a shock absorber incorporating the continuously variable damping capabilities in accordance with the present invention.

Referring now to the drawings in which like reference numerals designate like or corresponding parts throughout the several views, there is shown in FIG. 1 a shock absorber incorporating the continuously variable damping adjustment mechanism in accordance with the present invention which is designated generally by the reference numeral 10. Shock absorber 10 is a dual tube shock absorber which comprises a piston 12, a piston rod 14, a pressure tube 16 and a reserve tube 18. Piston 12 divides pressure tube 16 into an upper working chamber 20 and a lower working chamber 22. Piston rod 14 is connected to piston 12 and it extends out of pressure tube 16 and reserve tube 18 for attachment to one of the sprung or unsprung masses of the vehicle by methods known well in the art. Pressure tube 16 is filled with hydraulic fluid which moves between upper working chamber 20 and lower working chamber 22 during movement of piston 12 and piston rod 14 with respect to pressure tube 16. The flow of fluid through piston 12 between chambers 20 and 22 of pressure tube 16 is controlled by a valving system in piston 12 (see FIGS. 8 and 11) to provide for the damping of the movement of piston 12 and piston rod 14. The valving system for piston 12 will be described in greater detail later herein.

Reserve tube 18 surrounds pressure tube 16 and with pressure tube 16 defines a reserve chamber 24. Reserve tube 18 is adapted for attachment to the other of the sprung or unsprung mass of the vehicle by methods known well in the art. During the stroke of piston 12 and piston rod 14 a different volume of fluid flows into or out of upper working chamber 20 than the fluid that flows into or out of lower working chamber 22. This difference in volume is due to piston rod 14 being located only in upper working chamber 20 and not in lower working chamber 22. This volume of fluid is known as "rod volume." The "rod volume" of fluid is compensated for by a base valve assembly 26 positioned at the bottom of shock absorber 10. Base valve assembly 26 controls the fluid flow between lower working chamber 22 and reserve chamber 24. Reserve chamber 24 is partially filled with hydraulic fluid and partially filled with a pressurized gas with the level of hydraulic fluid being determined by the position of piston 12 within pressure tube 16. Base valve assembly 26 and the fluid flow through it will be described later herein.

The shock absorber as described above is well known in the art. The present invention is directed to an adjustment mechanism 30 which controls a fluid bypass between upper working chamber 20 and lower working chamber 22 to adjust the damping characteristics of shock absorber 10 between a soft ride when the fluid bypass is open and a firm ride when the fluid bypass is closed.

Figure 2:
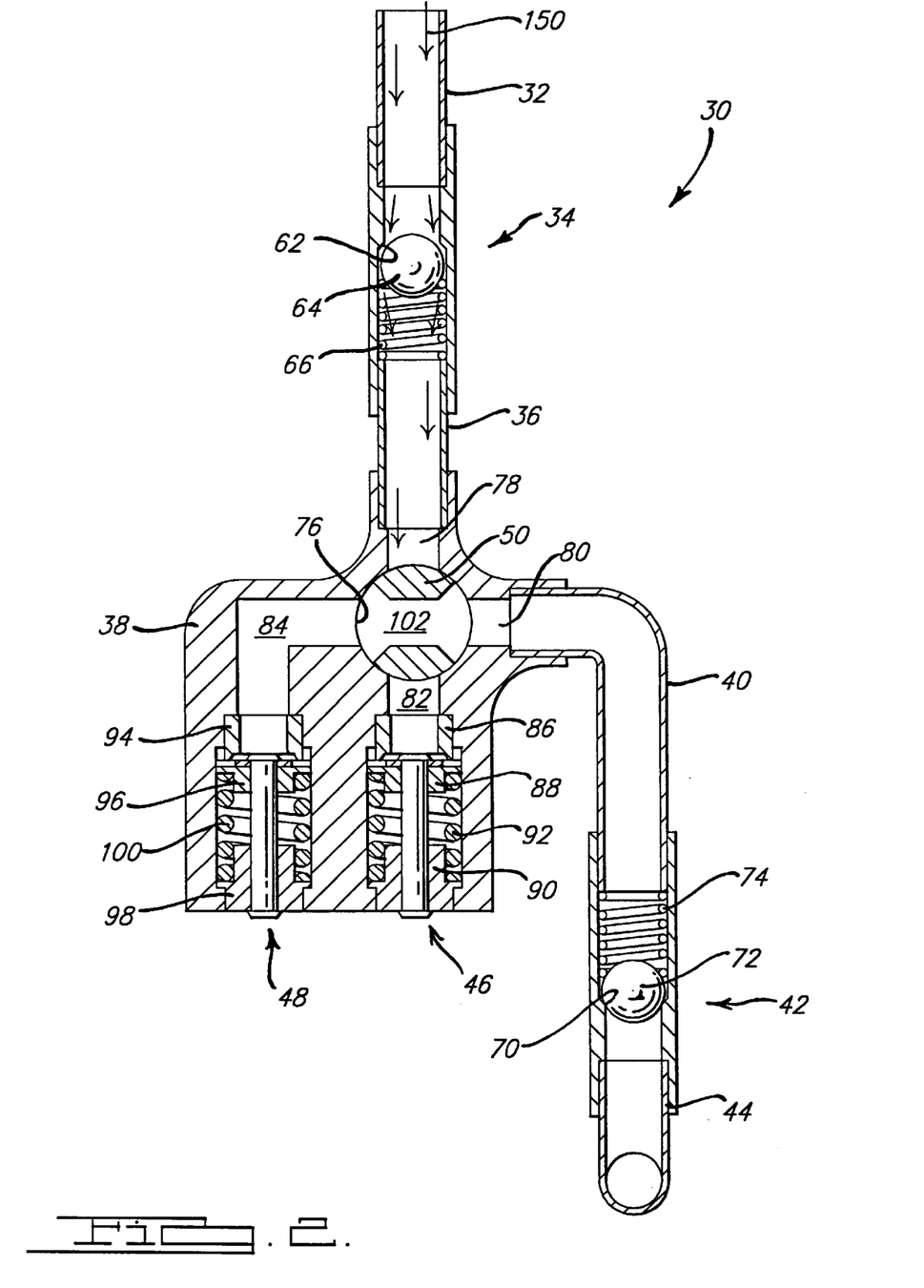
FIG. 2 is a cross-sectional schematic side view illustrating the shock absorber shown in FIG. 1 and the fluid flow during extension when the shock absorber is configured to provide a firm ride during extension and a soft ride during compression of the shock absorber.

Referring to FIGS. 1 and 2, adjustment mechanism 30 comprises an upper transfer tube 32, an upper check valve 34, a lower transfer tube 36, a valve body 38, an upper transfer tube 40, a lower check valve 42, a lower transfer tube 44, an extension check valve assembly 46, a compression check valve assembly 48 and a valve stem 50.

Upper working chamber 20 fluidically communicates with a fluid passage 52 which extends through an upper rod guide 54 to mate with a chamber 56 formed between a lower rod guide 58 and upper rode guide 54. Upper transfer tube 32 is in communication with chamber 56 through a fluid passage 60 within which upper transfer tube 32 is located. Upper transfer tube 32 transfers fluid from chamber 56, through tube 32 and into upper check valve 34. Fluid travels through upper check valve 34, through lower transfer tube 36 and into valve body 38. Upper check valve 34 comprises a valve seat 62, a check ball 64 by and a biasing spring 66 for biasing check ball 64 against valve seat 62. Upper check valve 34 permits fluid flow from tube 32 to tube 36 and prohibits fluid flow from tube 36 to tube 32.

Lower working chamber 22 is in communication with lower transfer tube 44 through a fluid passage 68 formed within pressure tube 16 within which lower transfer tube 44 is located. Lower transfer tube 44 transfers fluid from lower working chamber 22 through tube 44 and into lower check valve 42. Fluid travels through lower check valve 42, through upper transfer tube 40 and into valve body 38. Lower check valve 42 comprises a valve seat 70, a check ball 72 and a biasing spring 74 for biasing check ball 72 against valve seat 70. Lower check valve 42 permits fluid flow from tube 44 to tube 40 but prohibits fluid flow from tube 40 to tube 44.

Valve body 38 is located within reserve chamber 24 and provides a valve chamber 76 within which valve stem 50 is rotatably disposed. Valve body 38 defines two input passages 78 and 80 and two outlet passages 82 and 84. Input passage 78 fluidically connects lower transfer tube 36 with valve chamber 76. Input passage 80 fluidically connects upper transfer tube 40 with valve chamber 76. Outlet passages 82 and 84 both fluidically connect valve chamber 76 with reserve chamber 24.

Extension check valve assembly 46 is disposed within outlet passage 82 and comprises a valve seat 86, a valve member 88, a valve guide 90 and a biasing spring 92 for biasing valve member 88 against valve seat 86. Extension check valve assembly 46 allows fluid flow from valve chamber 76 through outlet passage 82 and into reserve chamber 24 but prohibits fluid flow from reserve chamber 24 into valve chamber 76. Compression check valve assembly 48 is disposed within outlet passage 84 and comprises a valve seat 94, a valve member 96, a valve guide 98 and a biasing spring 100 for biasing valve member 96 against valve seat 94. Compression check valve assembly 48 allows fluid flow from valve chamber 76 through outlet passage 84 and into reserve chamber 24 but prohibits fluid flow from reserve chamber 24 into valve chamber 76.

Valve stem 50 is rotatably disposed within chamber 76 and it defines a fluid passageway 102 which permits fluid flow between input passages 78 and 80 and outlet passages 82 and 84 depending upon the position of fluid passageway 102 with respect to valve chamber 76. Valve stem 50 extends through valve body 38 to mate with a stepper motor 104. Stepper motor 104 is attached to shock absorber 10 by a housing 106. Housing 106 is disposed within an aperture 108 extending through reserve tube 18 and it mounts both stepper motor 104 and valve body 38. Stepper motor 104 is activated by an external source (not shown) to rotate valve stem 50 to select the damping characteristics for shock absorber 10. The input to stepper motor 104 can be manually provided or the input can be provided by a micro-computer (not shown) which simultaneously monitors the operating characteristics and conditions of the vehicle to select the damping rate for shock absorber 10 based on a pre-selected set of conditions.

The valving system provided by piston 12 and base valve assembly 26 are designed to provide a firm ride or a high damping rate. Adjustment mechanism 30 provides a fluid bypass route between chambers 20 and 22 which reduce the damping rate for shock absorber 10 when the bypass route is open.

Figure 11:
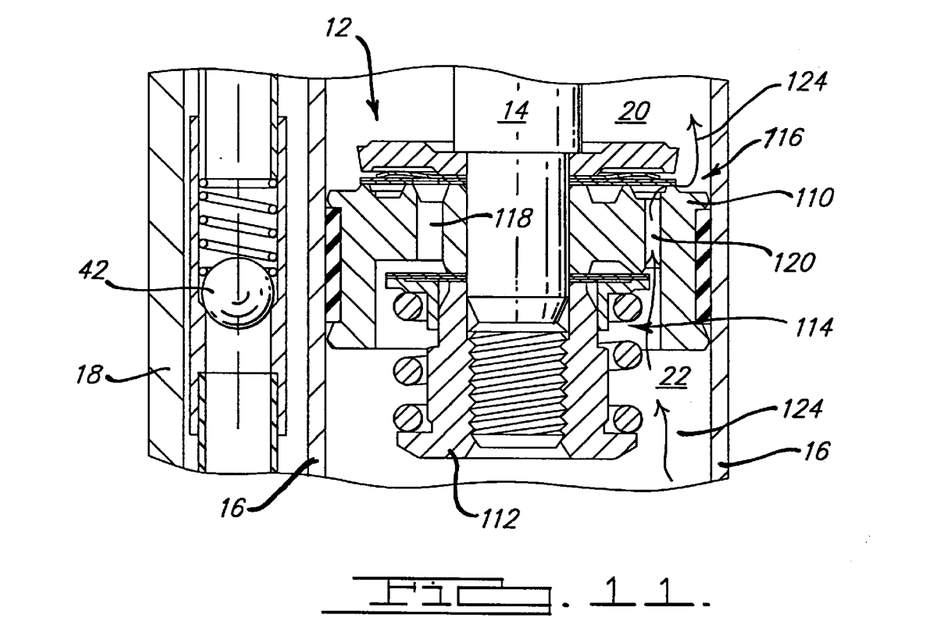
FIG. 11 is a cross-sectional view of the valving system of the piston similar to FIG. 8 but having the arrows illustrating the fluid flow during compression of the shock absorber.

The valving system for piston 12 is shown in greater detail in FIGS. 8 and 11. The valving system for piston 12 determines the damping characteristics for an extension movement of shock absorber 10. In the present invention, the valving system of piston 12 provides a firm damping characteristic during extension movement of shock absorber 10. Piston 12 comprises a valve body 110, a retention nut 112, an extension valve assembly 114 and a compression valve assembly 116. Valve body 110 defines an extension passage 118 and a compression passage 120 which provide the routes for fluid to flow between chambers 20 and 22. FIG. 8 illustrates an extension movement of shock absorber 10 with arrows 122 depicting fluid flow. During an extension movement of shock absorber 10, fluid in upper chamber 20 becomes pressurized and fluid in lower chamber 22 is reduced in pressure. Fluid flows out of upper chamber 20 through extension passage 118 and past extension valve assembly 114 to enter lower chamber 22. FIG. 11 illustrates a compression movement of shock absorber 10 with arrows 124 depicting fluid flow. During a compression movement of shock absorber 10, fluid in lower chamber 22 becomes pressurized and fluid in upper chamber 20 is reduced in pressure. Fluid flows out of lower chamber 22 through compression passage 120 and past compression valve assembly 116 to outer upper chamber 20.

Figure 9:
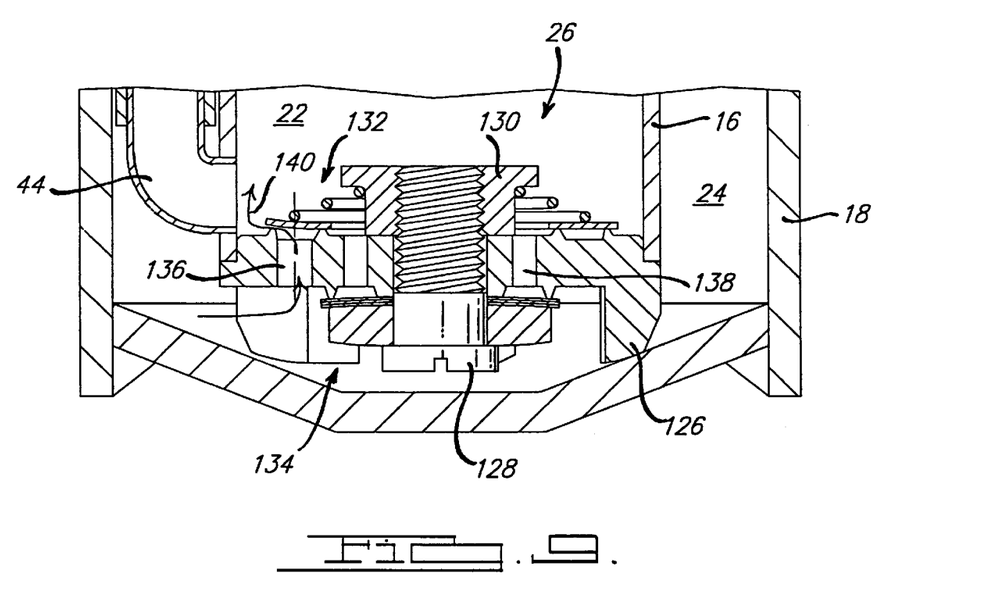
FIG. 9 is a cross-sectional view of the base valving of the shock absorber with the arrows illustrating the fluid flow during extension of the shock absorber.
Figure 10:
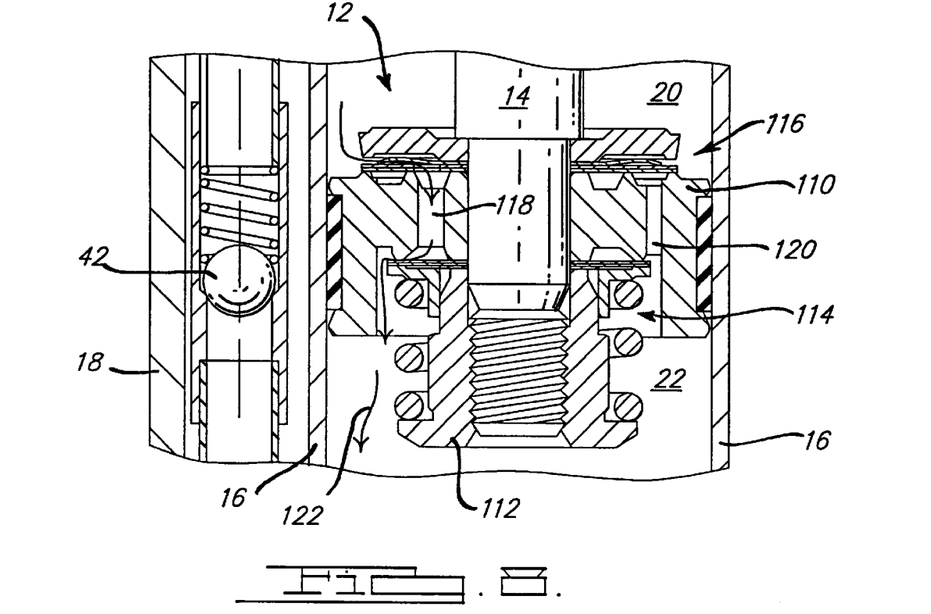
FIG. 10 is a cross-sectional view of the base valve similar to FIG. 9 but having the arrows illustrating the fluid flow during compression of the shock absorber.

The valving system for base valve assembly 26 is shown in greater detail in FIGS. 9 and 10. The valving system for base valve assembly 26 determines the damping characteristics for a compression movement of shock absorber 10. In the present invention, the valving system of base valve assembly 26 provides a firm damping characteristic during a compression movement of shock absorber 10. Valve assembly 26 comprises a valve body 126, retention bolt 128, a retention nut 130, an extension valve assembly 132 and a compression valve assembly 134. Valve body 126 defines an extension passage 136 and a compression passage 138 which provide routes for fluid to flow between chambers 22 and 24. FIG. 9 illustrates an extension movement of shock absorber 10 with arrows 140 depicting fluid flow. During an extension movement of shock absorber 10, fluid in lower chamber 22 experiences a drop in pressure due to the movement of piston 12. This drop in pressure in combination with the gas pressure in reserve chamber 24 causes fluid to flow out of reserve chamber 24 through extension passage 136 and past extension valve assembly 132 to enter lower chamber 22. FIG. 10 illustrates a compression movement of shock absorber 10 with arrows 142 depicting fluid flow. During a compression movement of shock absorber 10, fluid in lower chamber 22 becomes pressurized above that of reserve chamber 24 and fluid flows out of lower chamber 22 through compression passage 138 and past compression valve assembly 134.

Figure 3:
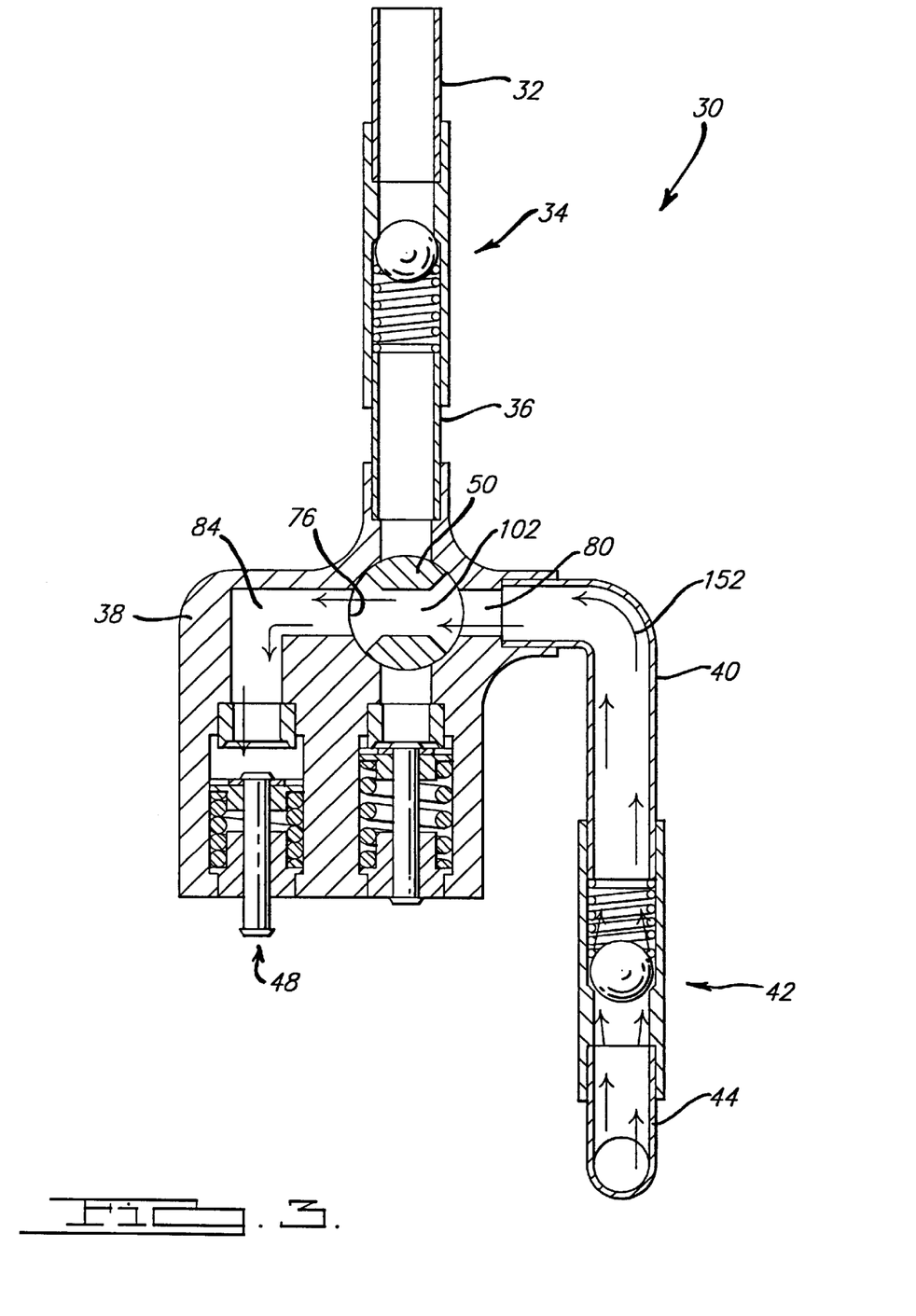
FIG. 3 is a cross-sectional view similar to FIG. 2 but showing the shock absorber and the fluid flow during compression when the shock absorber is configured to provide a firm ride during extension and a soft ride during compression of the shock absorber.

FIGS. 2 and 3 illustrate adjustment mechanism 30 positioned to provide a firm damping rate during extension of shock absorber 10 and a soft damping rate during compression of shock absorber 10. FIG. 2 illustrates the fluid flow for an extension movement. Fluid flow from upper chamber 20 to adjustment mechanism 30 as shown by arrows 150 for a high damping conditioning during extension. Valve stem 50 is rotated to prohibit fluid flow from input passage 78 into valve chamber 76. Thus, during an extension movement of piston 12, fluid in upper working chamber 20 is pressurized forcing fluid into upper transfer tube 32, through upper check valve 34 through lower transfer tube 36 and into input passage 78. Fluid is prohibited from leaving input passage 78 due to the position of valve stem 50 and all fluid flow between upper working chamber 20 and lower working chamber 22 will occur through the valving system in piston 12 as shown in FIG. 8 and described above providing a firm damping rate during extension movements. The rod volume of fluid will flow through base valve assembly 26 from reserve chamber 24 and into lower working chamber 22 as shown in FIG. 9 and described above.

FIG. 3 illustrates the same configuration for adjustment mechanism 30 but arrows 152 illustrate fluid flow for a soft damping condition during a compression movement of shock absorber 10. When valve stem 50 is rotated to prohibit fluid flow from input passage 78 into valve chamber 76, fluid flow from input passage 80, through valve chamber 76 and into outlet passage 84 is permitted due to fluid passageway 102 in valve stem 50. Fluid flow continues through passage 84 past compression check valve assembly 48 and into reserve chamber 24. This fluid flow is in addition to the fluid flow between lower working chamber 22 and reserve chamber 24 which occurs through base valve 26 as shown in FIG. 10 and described above thus softening the damping characteristics for shock absorber 10. Fluid flow between lower chamber 22 and upper chamber 20 to offset rod volume is as shown in FIG. 11 and described above because the pressure required to open check valve assembly 48 and compression valve assembly 134 of base valve 26 is higher than the pressure required to open compression valve assembly 116.

Figure 4:
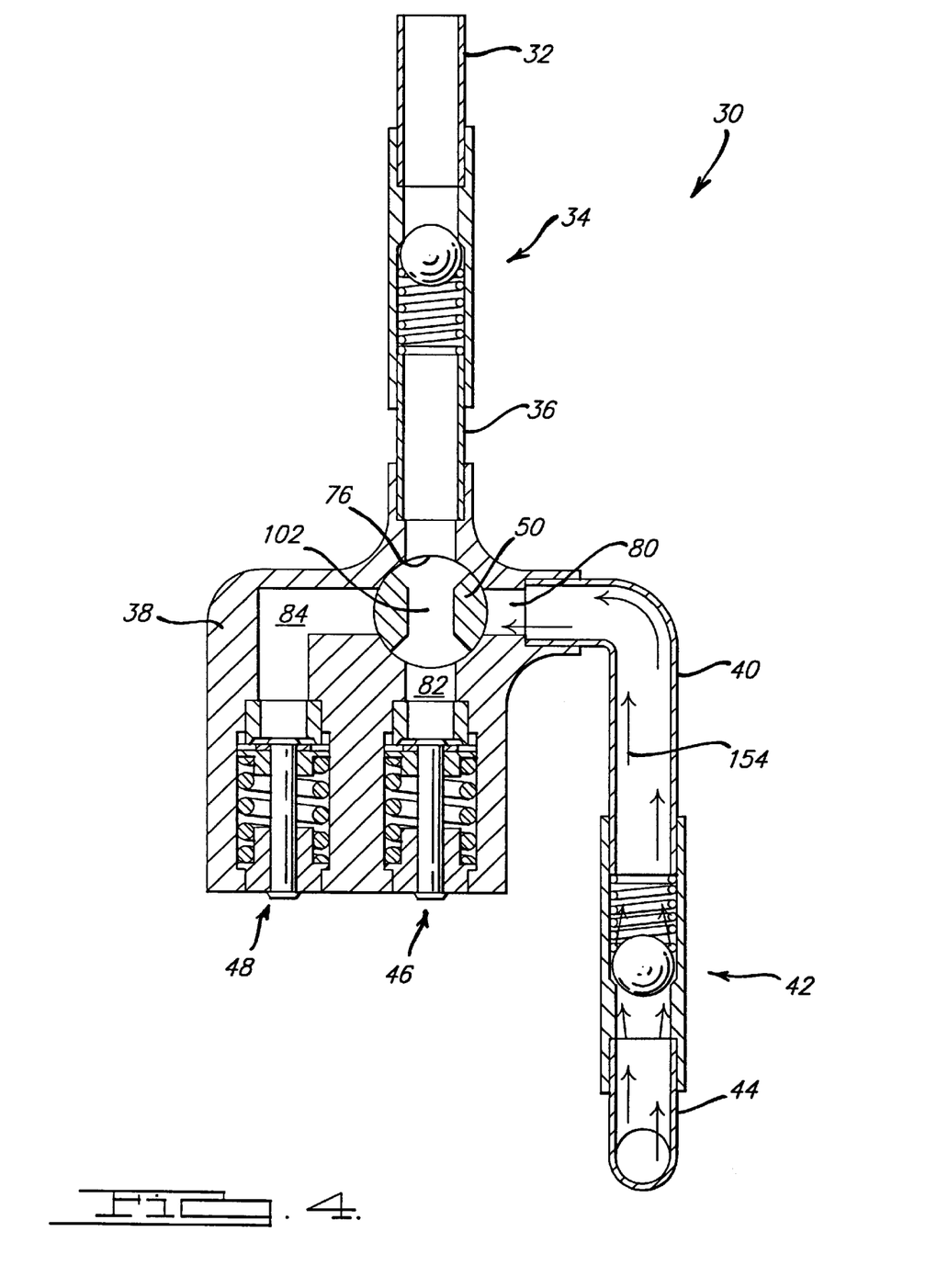
FIG. 4 is a cross-sectional schematic side view illustrating the shock absorber shown in FIG. 1 and the fluid flow during compression when the shock absorber is configured to provide a firm ride during compression and a soft ride during extension of the shock absorber.
Figure 5:
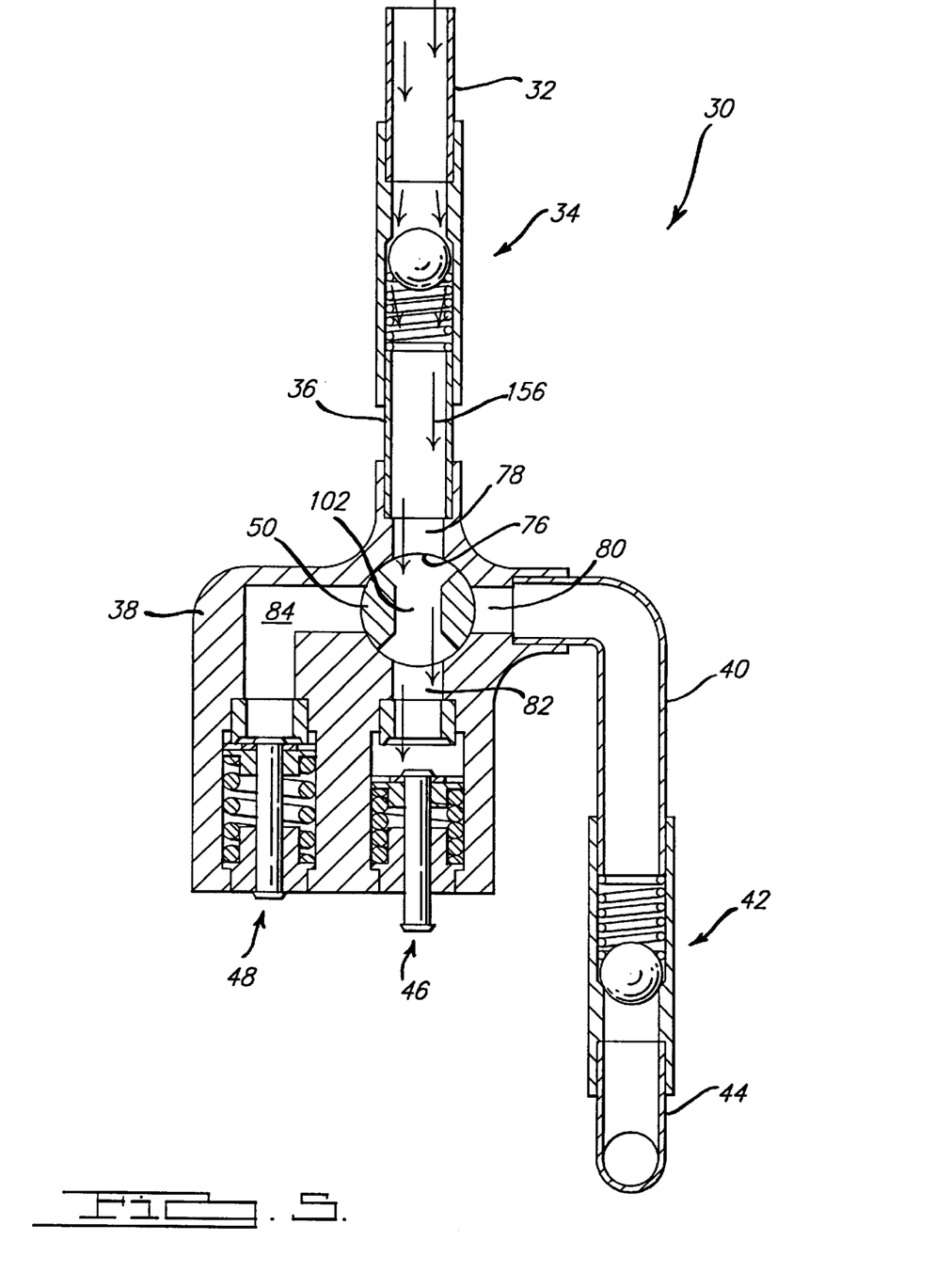
FIG. 5 is a cross-sectional view similar to FIG. 4 but showing the shock absorber and the fluid flow during extension when the shock absorber is configured to provide a firm ride during compression and a soft ride during extension of the shock absorber.

FIGS. 4 and 5 illustrate adjustment mechanism 30 positioned to provide a firm damping during compression of shock absorber 10 and a soft damping during extension of shock absorber 10. FIG. 4 illustrates the fluid flow for a compression movement. Fluid flow from lower chamber 22 to adjustment mechanism 30 is shown by arrows 154 for a firm damping condition during compression. Valve stem 50 is rotated to prohibit fluid flow from input passage 80 into valve chamber 76. Thus, during a compression movement of piston 12, fluid in lower working chamber 22 is pressurized forcing fluid into lower transfer tube 44, through lower check valve 42, through upper transfer tube 40 and into input passage 80. Fluid is prohibited from leaving input passage 80 due to the position of valve stem 50 and all fluid flow between lower working chamber 22 and reserve chamber 24 will occur through base valve 26 as shown in FIG. 10 and described above providing a firm damping rate during compression movements. Fluid flow from lower working chamber 22 to upper working chamber 20 will occur through the valving system of piston 12 as shown in FIG. 11 and described above because the pressure required to open compression valve assembly 134 of base valve assembly 26 is higher than the pressure required to open compression valve assembly 116.

FIG. 5 illustrates the same configuration for adjustment mechanism 30 but arrows 156 illustrate fluid flow for a soft damping rate during an extension movement of shock absorber 10. When valve stem 50 is rotated to prohibit fluid flow from input passage 80 into valve chamber 76, fluid flow from input passage 78, through valve chamber 76 and into outlet passage 82 is permitted due to fluid passageway 102 in valve stem 50. Fluid flow continues through passage 82 past extension valve assembly 46 and into reserve chamber 24. This fluid flow is in addition to the fluid flow between upper working chamber 20 and lower working chamber 22 which occurs through piston 12 as shown in FIG. 8 and described above thus softening the damping characteristics for shock absorber 10. Fluid flow between reserve chamber 24 and lower chamber 22 to offset rod volume is as shown if FIG. 9 and described above.

Figure 6:
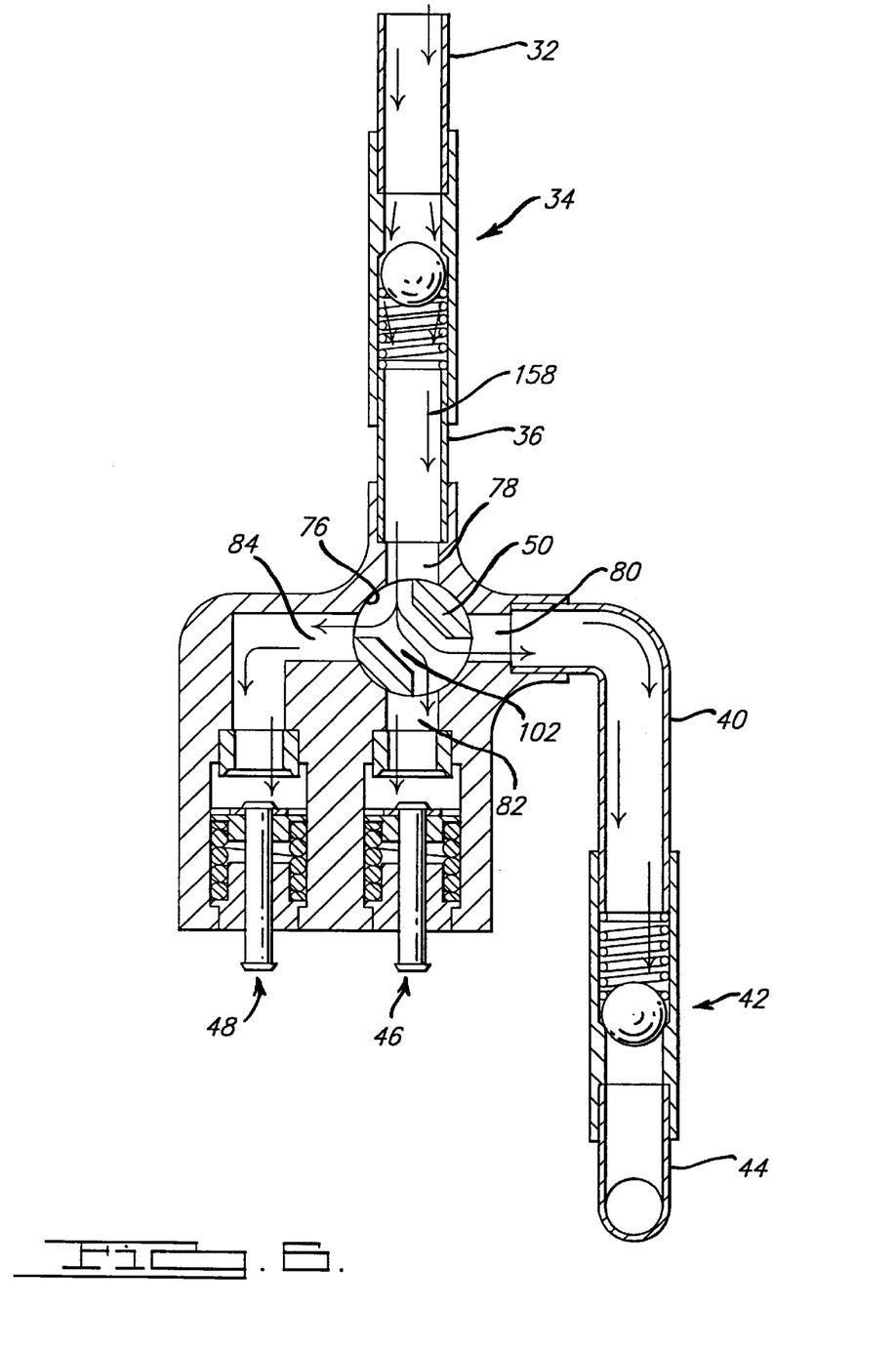
FIG. 6 is a cross-sectional view similar to FIG. 2 but showing the shock absorber and the fluid flow during extension when the shock absorber is configured to provide a soft ride during extension and compression of the shock absorber.
Figure 7:
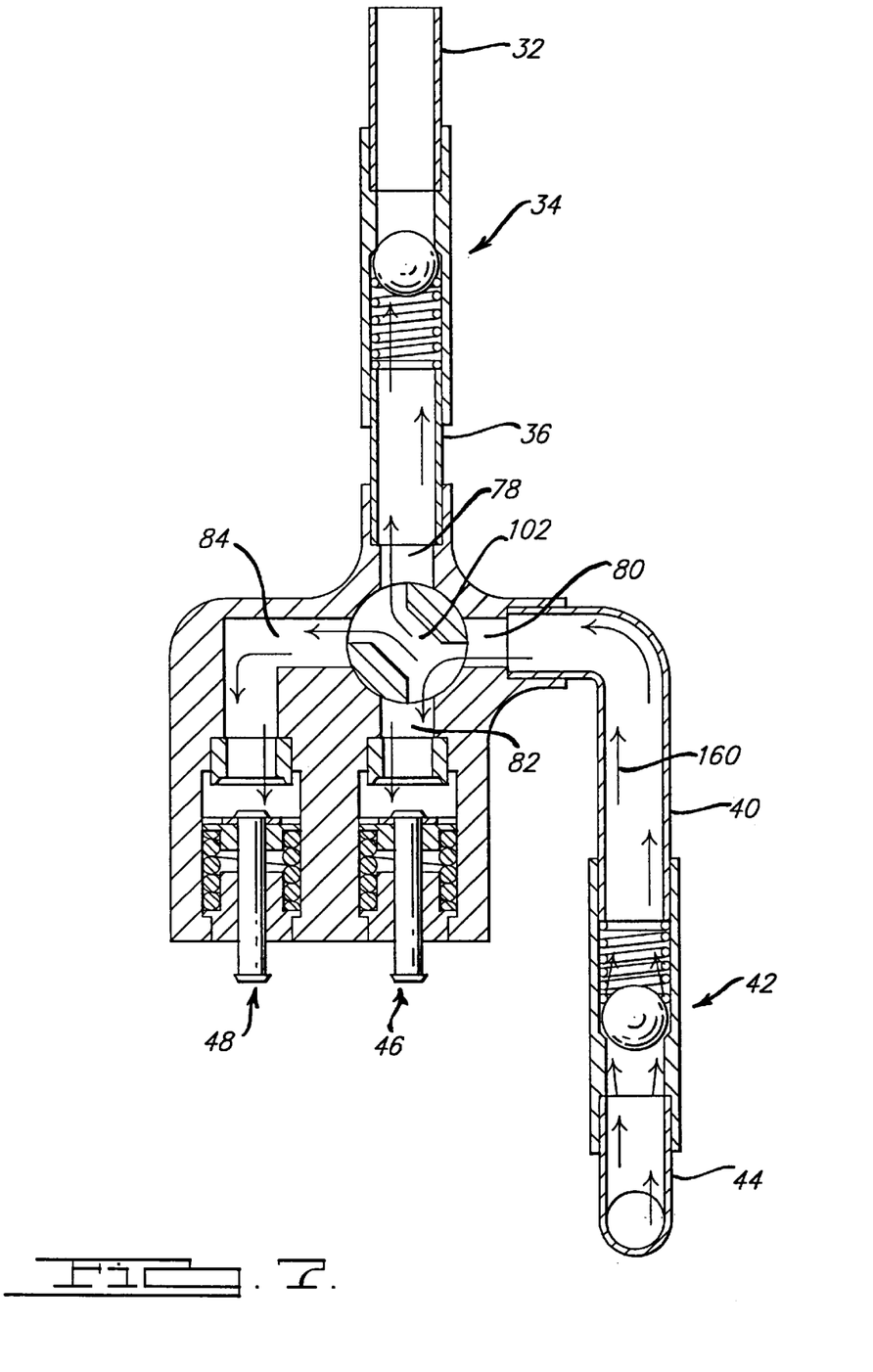
FIG. 7 is a cross-sectional view similar to FIG. 2 but showing the shock absorber and the fluid flow during compression when the shock absorber is configured to provide a soft ride during extension and compression of the shock absorber.

FIGS. 6 and 7 illustrate adjustment mechanism 30 positioned to provide a soft damping rate during an extension movement of shock absorber 10 and a soft damping rate during a compression movement of shock absorber 10. Valve stem 50 is rotated to provide fluid flow from input passage 78, through valve chamber 76 and into outlet passage 82 while simultaneously providing fluid flow from input passage 80, through valve chamber 76 and into outlet passage 84.

FIG. 6 shows fluid movement, arrows 158, during an extension movement of piston 12. Fluid in upper working chamber 20 is pressurized forcing fluid into upper transfer tube 32, through upper check valve 34, through lower transfer tube 36, through input passage 78, through passageway 102, through outlet passage 82, past extension check valve 46 and into reserve chamber 24. Fluid flow will also travel through passageway 102 through outlet passage 84, past compression check valve 48 and into reserve chamber 24. This fluid flow is in addition to the fluid flow between upper working chamber 20 and lower working chamber 22 which occurs through piston 12 as shown in FIG. 8 and described above thus softening the damping characteristics for shock absorber 10. Fluid flow between reserve chamber 24 and lower chamber 22 to offset rod volume is as shown in FIG. 9 and described above.

FIG. 7 shows fluid movement, arrows 160, during a compression movement of piston 12, fluid in lower working chamber 22 is pressurized forcing fluid into lower transfer tube 44, through lower check valve 42, through upper transfer tube 40, through input passage 80, through passageway 102, through outlet passage 84, past compression check valve 48 and into reserve chamber 24. Fluid flow will also travel through passageway 102 through outlet passage 82, past extension check valve 46 and into reserve chamber 24. This fluid flow is in addition to the fluid flow between lower working chamber 22 and reserve chamber 24 which occurs through base valve 26 as shown in FIG. 10 and described above thus softening the damping characteristics for shock absorber 10. Fluid flow between lower chamber 22 and upper chamber 20 to offset rod volume is as shown in FIG. 11 and described above because the pressure required to open check valve assemblies 46 and 48 and compression valve assembly 134 of base valve 26 is higher than the pressure required to open compression valve 116.

While the present invention has been described as having three positions for valve stem 50, it can be seen that by making stepper motor 104 turn valve stem 50 in smaller increments, virtually any intermediate damping characteristic for shock absorber 10 in a compression movement and an extension movement can be generated.

While the above detailed description describes the preferred embodiment of the present invention, it should be understood that the present invention is susceptible to modification, variation and alteration without deviating from the scope and fair meaning of the subjoined claims.

What is claimed is:

1. An adjustable shock absorber comprising:
   a pressure tube defining a working chamber;
   a reserve tube disposed around said pressure tube to define a reserve chamber between said pressure tube and said reserve tube;
   a piston rod extending through said pressure tube and into said working chamber;
   a piston assembly slidably disposed within said pressure tube and connected to said piston rod, said piston assembly dividing said working chamber into an upper working chamber and a lower working chamber, said piston assembly including a piston valve assembly for controlling fluid flow between said upper and lower working chambers;
   a base valve assembly disposed between said reserve chamber and said lower working chamber for controlling fluid flow between said reserve chamber and said lower working chamber;
   a first bypass valve assembly disposed in a first fluid path extending between said reserve chamber and said upper working chamber, said first bypass valve assembly controlling fluid flow between said upper working chamber and said reserve chamber; and
   a second bypass valve assembly disposed in a second fluid path extending between said reserve chamber and said lower working chamber, said second bypass valve assembly controlling fluid flow between said lower working chamber and said reserve chamber.

2. The adjustable shock absorber according to claim 1 further comprising a stepper valve assembly disposed between said reserve chamber and said first and second bypass valve assemblies.

3. The adjustable shock absorber according to claim 1 wherein, said first bypass assembly includes a check valve for prohibiting fluid flow from said reserve chamber to said upper working chamber.

4. The adjustable shock absorber according to claim 1 wherein, said second bypass assembly includes a check valve for prohibiting fluid flow from said reserve chamber to said lower working chamber.

5. The adjustable shock absorber according to claim 1 wherein, said first bypass assembly includes a pair of check valves for prohibiting fluid flow from said reserve chamber to said upper working chamber.

6. The adjustable shock absorber according to claim 1 wherein, said second bypass assembly includes a pair of check valves for prohibiting fluid flow from said reserve chamber to said lower working chamber.

7. The adjustable shock absorber according to claim 1 further comprising a valve body defining a fluid chamber in fluid communication with said both first and second bypass assemblies.

8. The adjustable shock absorber according to claim 7 wherein, said first bypass valve assembly includes a check valve disposed between said upper working chamber and said fluid chamber for prohibiting fluid flow from said fluid chamber to said upper working chamber.

9. The adjustable shock absorber according to claim 8 wherein, said first bypass valve assembly includes a check valve disposed between said reserve chamber and said fluid chamber for prohibiting fluid flow from said reserve chamber to said fluid chamber.

10. The adjustable shock absorber according to claim 7 wherein, said second bypass valve assembly includes a check valve disposed between said lower working chamber and said fluid chamber for prohibiting fluid flow from said fluid chamber to said lower working chamber.

11. The adjustable shock absorber according to claim 8 wherein, said second bypass valve assembly includes a check valve disposed between said reserve chamber and said fluid chamber for prohibiting fluid flow from said reserve chamber to said fluid chamber.

12. The adjustable shock absorber according to claim 7 further comprising a valve stem disposed within said fluid chamber for selectively opening and closing said first fluid path.

13. The adjustable shock absorber according to claim 12 wherein, said valve stem selectively opens and closes said second fluid path.

14. The adjustable shock absorber according to claim 12 further comprising a stepper motor attached to said valve stem for selectively opening and closing said first fluid path.

15. The adjustable shock absorber according to claim 1 further comprising:
   a valve body defining a fluid chamber in fluid communication with both said first and second bypass assemblies;

a valve stem disposed within said fluid chamber for selectively opening and closing said first and second fluid paths; and a stepper motor attached to said valve stem for selectively opening said first and second fluid paths.

16. The adjustable shock absorber according to claim 15 wherein, said first bypass valve assembly includes a check valve disposed between said upper working chamber and said fluid chamber for prohibiting fluid flow from said fluid chamber to said upper working chamber.

17. The adjustable shock absorber according to claim 16 wherein, said first bypass valve assembly includes a check valve disposed between said reserve chamber and said fluid chamber for prohibiting fluid flow from said reserve chamber to said fluid chamber.

18. The adjustable shock absorber according to claim 15 wherein, said second bypass valve assembly includes a check valve disposed between said lower working chamber and said fluid chamber for prohibiting fluid flow from said fluid chamber to said lower working chamber.

19. The adjustable shock absorber according to claim 18 wherein, said second bypass valve assembly includes a check valve disposed between said reserve chamber and said fluid chamber for prohibiting fluid flow from said reserve chamber to said fluid chamber.

20. An adjustable shock absorber comprising:

a pressure tube defining a working chamber;

a reserve tube disposed around said pressure tube to define a reserve chamber between said pressure tube and said reserve tube;

a piston rod extending through said pressure tube and into said working chamber;

a piston assembly slidably disposed within said pressure tube and connected to said piston rod, said piston assembly dividing said working chamber into an upper working chamber and a lower working chamber, said piston assembly including a first piston valve assembly for controlling fluid flow from said upper working chamber to said lower working chamber and a second piston valve assembly for controlling fluid flow from said lower working chamber to said upper working chamber;

a base valve assembly disposed between said reserve chamber and said lower working chamber for controlling fluid flow between said reserve chamber and said lower working chamber;

a first bypass valve assembly disposed in a first fluid path extending between said reserve chamber and said upper working chamber; and a second bypass valve assembly disposed in a second fluid path extending between said reserve chamber and said lower working chamber.

* * * * *